US010223585B2

(12) United States Patent
Cohen et al.

(10) Patent No.: US 10,223,585 B2
(45) Date of Patent: Mar. 5, 2019

(54) PAGE SEGMENTATION OF VECTOR GRAPHICS DOCUMENTS

(71) Applicant: Adobe Systems Incorporated, San Jose, CA (US)

(72) Inventors: Scott Cohen, Sunnyvale, CA (US); Brian Lynn Price, San Jose, CA (US); Dafang He, State College, PA (US); Michael F. Kraley, Lexington, MA (US); Paul Asente, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 81 days.

(21) Appl. No.: 15/589,484

(22) Filed: May 8, 2017

(65) Prior Publication Data

US 2018/0322339 A1   Nov. 8, 2018

(51) Int. Cl.
*G06K 9/00* (2006.01)
*G06K 9/62* (2006.01)

(52) U.S. Cl.
CPC ..... *G06K 9/00456* (2013.01); *G06K 9/00463* (2013.01); *G06K 9/6256* (2013.01)

(58) Field of Classification Search
CPC ........... G06K 9/00456; G06K 9/00463; G06K 9/6256
See application file for complete search history.

(56) References Cited

U.S. PATENT DOCUMENTS

| 8,645,819 B2 * | 2/2014 | Dejean .................. G06F 17/211 715/200 |
| 2002/0106124 A1 * | 8/2002 | Wang ................. G06K 9/00449 382/173 |

(Continued)

OTHER PUBLICATIONS

Anil K. Jain et al., "Document Representation and Its Application to Page Decomposition", IEEE Transactions on Pattern Analysis and Machine Intelligence, vol. 20, No. 3, Mar. 1998. (Year: 1998).*

(Continued)

*Primary Examiner* — Brenda C Bernardi
(74) *Attorney, Agent, or Firm* — Kilpatrick Townsend & Stockton LLP

(57) ABSTRACT

Disclosed systems and methods generate page segmented documents from unstructured vector graphics documents. The page segmentation application executing on a computing device receives as input an unstructured vector graphics document comprising drawing commands. The application generates an element proposal for each of many areas on a page of the input document tentatively identified as being page elements. Each of the element proposals may be generated at least in part based on the drawing commands. The page segmentation application classifies each of the element proposals into one of a plurality of defined type of categories of page elements at least in part based on the drawing commands. The page segmentation application may further refine at least one of the element proposals and select a final element proposal for each element within the unstructured vector document. One or more of the page segmentation steps may be performed using a neural network.

18 Claims, 14 Drawing Sheets

(56) References Cited

U.S. PATENT DOCUMENTS

| | | | | |
|---|---|---|---|---|
| 2008/0055623 | A1* | 3/2008 | Piersol | G06T 11/60 358/1.13 |
| 2010/0174732 | A1* | 7/2010 | Levy | G06F 17/211 707/768 |
| 2015/0093021 | A1* | 4/2015 | Xu | G06K 9/00463 382/159 |

OTHER PUBLICATIONS

Kamran Etemad et al., "Multiscale Segmentation of Unstructured Document Pages Using Soft Decision Integration", IEEE Transactions on Pattern Analysis and Machine Intelligence, vol. 19, No. 1, Jan. 1997. (Year: 1997).*

Chen, Kai, et al., "Page Segmentation of Historical Document Images With Convolutional Autoencoders", In Document Analysis and Recognition (ICDAR), 2015 13th International Conference on, IEEE, Aug. 2015, 5 pages.

Chen, Liang-Chieh, et al., "Semantic Image Segmentation With Deep Convolutional Nets and Fully Connected CRFS", . arXiv preprint arXiv:1412.7062, Jun. 2014, 14 pages.

Amin, Adnan, et al., "Page Segmentation and Classification Utilizing Bottom-Up Approach", International Journal of Image and Graphics, vol. 1, Issue 2, Apr. 2001, 17 Pages.

Ha, Jaekyu, et al., "Document page decomposition by the bounding-box project", In Document Analysis and Recognition, 1995., Proceedings of the Third International Conference on, vol. 2, IEEE, Aug. 1995, 4 pages.

Ha, Jaekyu, et al., "Recursive Xy Cut Using Bounding Boxes of Connected Components", In Document Analysis and Recognition, 1995., Proceedings of the Third International Conference on, vol. 2, IEEE, Aug. 1995, 4 pages.

Lebourgeois, Frank, et al, "A Fast and Efficient Method for Extracting Text Paragraphs and Graphics From Unconstrained Documents", In Pattern Recognition, 1992. vol. I, . Conference B: Pattern Recognition Methodology and Systems, Proceedings., 11th IAPR International Conference on, IEEE, Sep. 1992, 5 pages.

Long, Jonathan, et al., "Fully Convolutional Networks for Semantic Segmentation", In Proceedings of the IEEE Conference on Computer Vision and Pattern Recognition, 2015, 10 pages.

Noh, Hyeonwoo, et al., "Learning Deconvolution Network for Semantic Segmentation", In Proceedings of the IEEE International Conference on Computer Vision, 2015, 9 pages.

Papandreou, George, et al., "Weakly-and Semi-Supervised Learning of a Deep Convolutional Network, ", In Proceedings of the IEEE International Conference on Computer Vision, 2015, 9 pages.

Shilman, Michael, et al., "Learning Non-Generative Grammatical Models for Document Analysis", In Tenth IEEE International Conference on Computer Vision (ICCV'05) vol. 2, IEEE, Oct. 2005, 8 pages.

Simon, Aniko, et al., "A Fast Algorithm for Bottom-Up Document Layout Analysis, IEEE Transactions on Pattern Analysis and Machine Intelligence", vol. 19, Issue 3, Mar. 1997, 5 pages.

Yu, Fisher, et al., "Multi-Scale Context Aggregation by Dilated Convolutions", Computer Vision and Pattern Recognition, Nov. 2015, arXiv preprint arXiv:1511.07122, v3, Apr. 2016, 13 pages.

* cited by examiner

801

803

804

PAGE SEGMENTATION OF VECTOR GRAPHICS DOCUMENTS

TECHNICAL FIELD

This disclosure relates generally to page segmentation. More specifically, but not by way of limitation, this disclosure relates to page segmentation of electronic documents having file formats such as Adobe® Portable Document Format (PDF), PostScript or other file formats that use a vector graphics model to define how page images are to be rendered on a display.

BACKGROUND

Page segmentation is the process of identifying each individual element, e.g., text block, table, figure, etc. appearing on each page of an electronic document. Software applications exist for performing page segmentation operations on "structured" documents, such as Microsoft® Word and other word processing documents. Structural information included within such document files typically identifies the positions and types of the various elements of the document.

Electronic documents such as Adobe® PDF documents, PostScript documents or other documents created using page description languages use a vector graphics model to define how page images are to be rendered on a display. These types of documents, which are referred to herein as "vector graphics documents," typically contain drawing commands that are interpreted by a compatible rendering application to render the page image(s) of the document. For example, drawing commands may incorporate or reference other information stored in the document file that specifies the paths (i.e., lines, curves) for drawing text and other graphics, as well as visual properties like text size, fonts, typeface, and other encodings to be rendered on the page. Some vector graphics documents may not contain structural information or other higher-level information identifying the different page elements within each page of the document. For example, documents created using older versions of PDF, PDF files of scanned documents, and images (e.g., JPEG images or TIFF images) of documents converted to PDF files may not include any structural information.

Vector graphics documents are widely used due to their compatibility with many different software applications, operating systems, and computing devices. The ability to determine or recover structural elements in an unstructured vector graphics document is crucial to the ability to intelligently reflow document pages on different types and sizes of display screens, making the document accessible to the visually impaired, and enabling higher level understanding of documents. For example, using structural information, each paragraph on a page can be identified and one paragraph at a time can be displayed on a small mobile phone screen. If the positions of tables and figures are known, their contents can be analyzed for further structural information. Such further structural information can potentially allow users to sort tables based on different columns or to query the data contained in the tables or figures.

Existing solutions for performing page segmentation on unstructured vector graphics documents typically use a set of complex, heuristic rules to automatically identify and tag various structural elements within the document. Heuristic algorithms are not self-correcting or self-adjusting, and thus require manual correction or addition of corner cases for which the algorithm does not properly function. For example, a heuristic algorithm may identify a table simply because it contains the word "table" and a number within the text. However, such a rule may not work for every variation. Manual intervention to add to or correct a heuristic algorithm to account for a special case may not be possible when a software solution has been deployed to the end user. Heuristics typically cannot consider information beyond the document itself. Existing solutions may not analyze embedded images within a document. Additionally, these solutions operate on only the vector graphics document, and do not perform any analysis on rendered page images.

Other existing object recognition methods are used to identify objects appearing in images of naturally occurring objects, e.g., photographs, drawings or other images of people, animals, plants, etc. While very effective on images of naturally occurring objects, these advanced image processing techniques for object recognition are not easily applied to the recognition of human-created objects or constructs (e.g., tables, charts, and paragraphs) that may be included in unstructured documents. For example, given a partial image of a person's body, it is a relatively straightforward exercise to extrapolate and predict the overall dimensions and shape of the person's entire body. However, if half a table is shown on one page of an unstructured document, prediction of the total number of rows of the table could be nearly impossible.

Accordingly, solutions are needed to more efficiently and properly analyze existing unstructured vector graphics documents to perform page segmentation on such documents.

SUMMARY

Systems and methods are disclosed herein for using one or more computing devices to automatically perform page segmentation on an input document. A method for generating a page segmented document from an unstructured vector graphics document is presented. The method receives an unstructured vector graphics document with drawing commands. The method generates element proposals for the unstructured vector graphics document. Each element proposal corresponds to an area on a page of the unstructured vector graphics document tentatively identified as being a recognized page element. Each of the element proposals is generated at least in part based on an analysis of the drawing commands of the received unstructured vector graphics document. In some embodiments, a page image may be rendered from the unstructured vector document and used as additional input for performing the step of generating the element proposal.

The proposal generation step results in creation of a boundary box or other boundary shape around each identified area of the page. The method then classifies each of the element proposals into one of a plurality of defined type of categories of page elements. The classification of element proposals may also be generated at least in part based on an analysis of the drawing commands. Further embodiments select a final set of element proposal for each element proposal within the page of the unstructured vector document. The final set of element proposals may be selected by resolving overlapping element proposals. The final set of element proposals is output as the page segmentation for the unstructured vector document.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 4, comprising

FIG. 7, comprising

FIG. 8, comprising

DETAILED DESCRIPTION

Introduction

Figure 1:
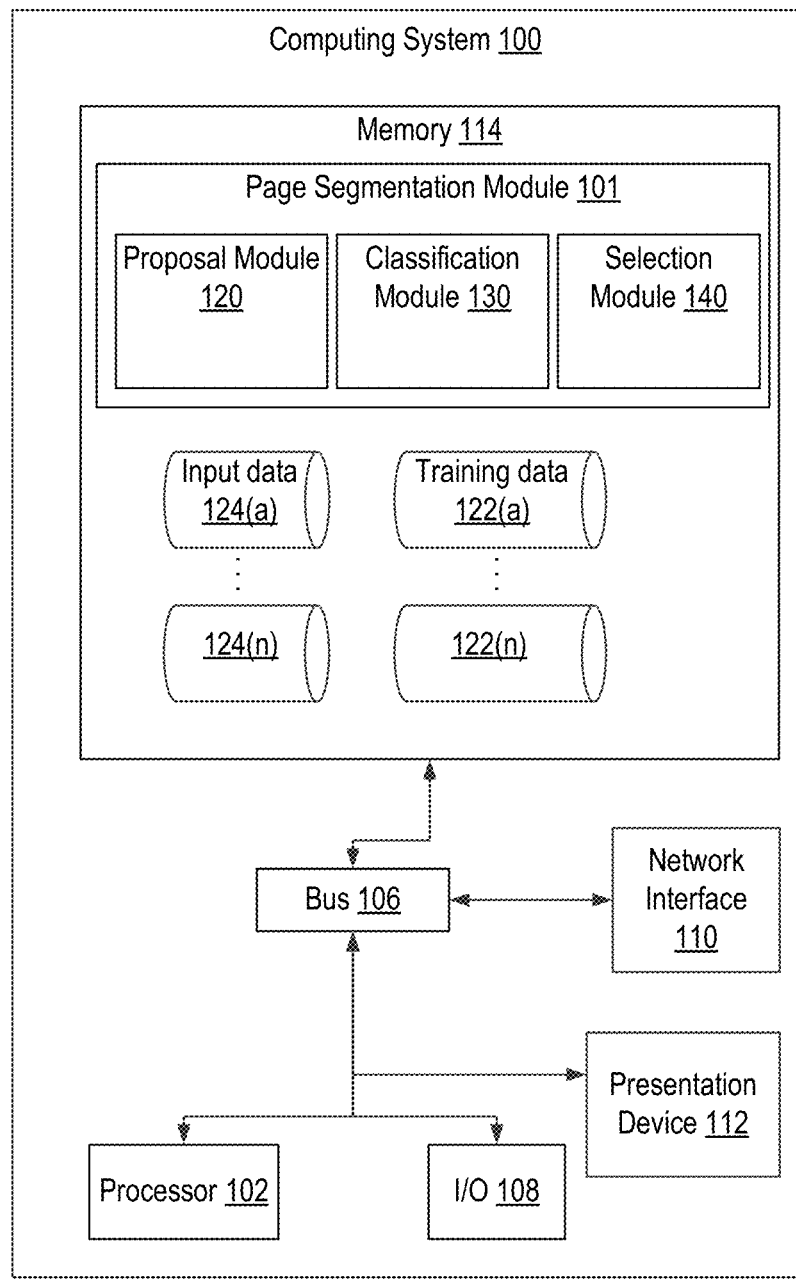
FIG. 1 is a diagram depicting an example of a system environment for performing page segmentation functions according to certain embodiments.

As discussed above, existing techniques used to perform page segmentation on unstructured vector graphics documents have various deficiencies. Existing solutions use complex, rule-based heuristics, which require manual intervention to account for "corner" cases (i.e., exceptional or non-typical cases) and have other inherent limitations. The present disclosure describes exemplary systems and methods for generating page segmentation data for unstructured vector graphics documents using machine learning algorithms trained to generate proposed page elements, classify such proposed page elements by type, and select a final set of page element proposals present within each page of the document.

More specifically, embodiments described herein receive, as input to specially configured and trained machine learning algorithms, an unstructured vector graphics document, such as an unstructured PDF document. The machine learning algorithms output information indicating, for each page within the document, the position of each element on that page. Element proposals are generated, each of which indicates an area on the page that is tentatively determined to be a page element. Each element proposal is categorized by element type, such as text block, table, figure, or other element. Additional analysis is then performed to select a final set of page element proposals by resolving any overlapping element proposals. Some, or all, of these steps may be performed using machine learning algorithms, and may therefore may be trained to self-improve or self-adjust over a number of iterations to provide improved page segmentation results as compared to prior solutions.

For example, in some embodiments, a deep convolution neural network, such as a "Faster R-CNN," may be designed and trained over multiple image resolutions to recognize and distinguish among different page elements. The deep convolution neural network may be set up to identify visual features of a document page by analyzing drawing commands to locate edges, corners, etc. of page elements and to thereby generate page element proposals for each document page. In some cases, the rendered page images of the input unstructured vector graphics documents may also be analyzed to assist with the identification of page element.

Similarly, in some embodiments, a standard convolutional neural network (CNN) may be designed and trained to classify page element proposals into three or more classes, such as text block, table and figure, etc. In some embodiments, a regression network may be designed and trained to resolve any overlapping element proposals to output a final set of instance-level page element proposals. In other embodiments, other types of machine learning algorithms and/or other image processing techniques may be used for performing each of the above steps, as described herein below.

In some embodiments, the systems and methods disclosed herein can be configured to perform page segmentation using input comprising (1) information embedded in an unstructured vector graphics document, e.g., information describing the document's text, fonts, paths, etc., and (2) the rendered page image obtained from the unstructured vector graphics document. In other embodiments, the systems and methods disclosed herein may be configured to operate using only the rendered page image generated from the unstructured vector graphics document. For example, in the case of a vector graphics document created from a scanned image of a document, no information regarding text, fonts, paths, etc. of the document will be available.

The exemplary machine learning algorithms described herein can be trained using a variety of training data, including unstructured vector graphics documents, images rendered from such documents, drawing command from such documents and/or any other data from or derived from such document. The disclosed embodiments determine structural information for unstructured electronic vector graphics documents and thereby enable new and more flexible operations to be performed on such documents, e.g., presenting such a document in an alternative visual form, or enabling intelligent search within the document.

Certain Definitions

As used herein, "unstructured vector graphics document" refers to a vector graphics document file that does not include structural data identifying individual elements occurring on any of the document's pages. For example, older PDF files, scanned PDF files, and pictures of documents converted to PDF files may not include any structural information. Additionally, while some vector graphics document files may have some limited structural information, those files may not have sufficient structural information or may define elements in an undesirable manner for purposes of performing page segmentation. Thus, the term "unstructured vector graphics" is used broadly herein to encompass even vector graphics documents with such limited structural information. It is to be understood that the embodiments described herein are configured to perform page segmentation on unstructured vector graphics document.

As used herein, the term "element" or "page element" is used to refer to a separately identifiable area of a page identifying a type of page object, such as a text box, figure, image, or other element. "Instance" is used herein to refer to one particular occurrence of one element type. For example, a document may contain two instances of a text box, and one instance of a figure. The term "proposal" refers to a tentative identification made by the page segmentation application as to an area of a page potentially representing a page element. The term "classification" refers to the selection of the type of a given element. For example, page elements may be classified as being one or more pre-defined element types.

Description of Certain Embodiments

The following non-limiting example is provided to introduce certain embodiments. A page segmentation application is executed to obtain details about the page elements within a page of an input document, including each of their positions within the page, their order of presentation, and their types. Element types, for example, may be defined as text, table, or image. In one example, a proposal module of the page segmentation application generates proposals for page elements within a page, each proposal identifying an area of the page tentatively determined to be a page element. A classification module then categorizes each proposed element by type, and then a selection module performs additional analysis on the classified proposed elements to determine a final set of page element proposals appearing within the page.

Embodiments of the page segmentation system and methods disclosed herein can use a variety of techniques to perform page segmentation. As discussed further, such techniques include the use of trained neural networks, deep learning techniques, image processing, object recognition, and others, used in conjunction with each other or separately. Some embodiments disclosed herein receive the vector graphics document as input. Other embodiments receive the vector graphics document and a page image rendered from the vector graphics document as input.

FIG. 1 depicts an example of a computing system 100 configured to execute a page segmentation application 101. The computing system includes one or more processors 102 communicatively coupled to one or more memory devices 114. The processor 102 executes computer-executable program code, which may be in the form of non-transitory computer-executable instructions, stored in the memory device 114, accesses information stored in the memory device 114, or both. Examples of the processor 102 include a microprocessor, an application-specific integrated circuit ("ASIC"), a field-programmable gate array ("FPGA"), or any other suitable processing device. The processor 102 can include any number of processing devices, including one.

The memory device 114 includes any suitable computer-readable medium for storing page segmentation application 101. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 100 may also include a number of external or internal devices such as input or output devices. For example, the computing system 100 is shown with an input/output ("I/O") interface 108 that can receive input from input devices or provide output to output devices. A bus 106 can also be included in the computing system 100. The bus 106 can communicatively couple one or more components of the computing system 100 and allow for communication between such components.

The computing system 100 executes program code that configures the processor 102 to perform one or more of the operations described above with respect to FIGS. 1-10. The page segmentation application 101 can include, for example, a proposal module 120, a classification module 130, and, in some embodiments, a selection module 140. The page segmentation application 101 may also or alternatively include other suitable modules or components that perform one or more operations described herein. The program code of the page segmentation application 101 and its various modules, which may be in the form of non-transitory computer-executable instructions, may be resident in the memory device 114 or any suitable computer-readable medium and may be executed by the processor 102 or any other one or more suitable processor. Execution of such program code configures or causes the processor(s) to perform the page segmentation methods described herein. In additional or alternative embodiments, the program code described above may be stored in one or more memory devices accessible by the computing system 100 from a remote storage device via a data network.

The memory 114 may also store one or more database or data structure to store data including training data $122(a)$-$(n)$ used to train various machine learning algorithms as will be described in more detail herein. For example, in some embodiments, one or more of the proposal module 120, the classification module 130 and the selection module 140 implements a machine learning algorithm, such as a neural network. The memory 114 may also store one or more database or data structure storing data including input data $124(a)$-$(n)$. Input data $124(a)$-$(n)$ may comprise the unstructured vector graphics documents and/or rendered page images on which the described page segmentation operations are to be performed. The page segmentation application 101 and any processes used for training its various modules can access any of the training data $122(a)$-$(n)$ and/or input data $124(a)$-$(n)$ in any suitable manner.

The computing system 100 also includes at least one network interface 110. The network interface 110 includes any device or group of devices suitable for establishing a wired or wireless data connection to one or more data networks. Non-limiting examples of the network interface 110 include an Ethernet network adapter, a modem, and/or the like. The computing system 100 is able to communicate with one or more other computing devices or computer-readable data sources via a data network using the network interface 110.

In some embodiments, the computing system 100 includes a presentation device 112. A presentation device 112 can include any device or group of devices suitable for providing visual, auditory, or other suitable sensory output. Non-limiting examples of the presentation device 112 include a touchscreen, a monitor, a speaker, a separate mobile computing device, etc. In some embodiments, the proposal module 120, the classification module 130, and/or the selection module 140 configures the presentation device 112 to present one or more of the training data 122(a)-(n), the input data 124(a)-(n), the page segmentation results, and/or any other relevant data.

Figure 2:
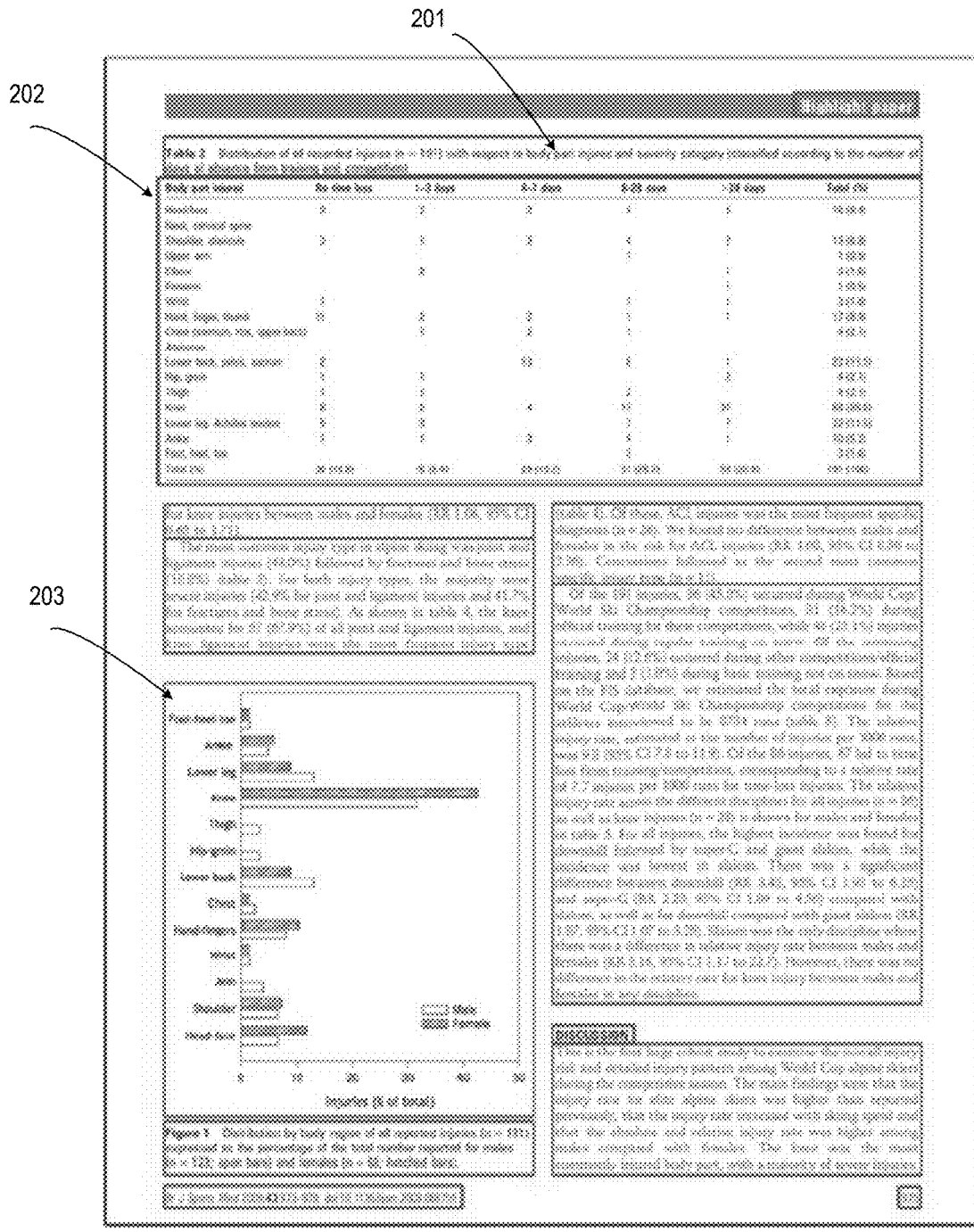
FIG. 2 is a diagram depicting an input vector graphics document file and goals for the page segmentation functions, according to certain exemplary embodiments.

FIG. 2 is a diagram depicting a rendered page image 200 of an input vector graphics document and output goals for the page segmentation functions, according to certain exemplary embodiments. The rendered page image 200 depicts a page containing different page elements selected from element types such as text blocks (e.g., text block 201), tables (e.g., table 202), and figures (e.g., FIG. 203). The page segmentation application 101 is configured to identify each instance of a page element, e.g., each occurrence of a text block, each occurrence of a figure, and each occurrence of a table.

FIG. 2 illustrates the ideal output goal of the page segmentation application 101 for the example page. Each instance of a page element is surrounded by a bounding box, e.g., a rectangle or square, that tightly conforms to the outer boundaries of that page element. Exemplary embodiments are herein described as using a bounding box, but those skilled in the art will understand that any other bounding shape may be used in alternative or additional embodiments. For example, in some embodiments, the bounding shape be any type or polygon, circle, oval, or other curved shape, etc. as appropriate to tightly conform to the outer boundaries of a page element. This bounding box and/or other bounding shape may or may not be displayed to the user. Information regarding the position of each bounding box and/or bounding shape, the type of element identified within each bounding box and/or other bounding shape, and the order of presentation of the various bounding boxes and/or other bounding shapes may be stored in or in connection with the input vector graphics document. For example, such information may be stored as meta-data added to the document file.

In the embodiment shown in FIG. 2, each text block represents a single paragraph or caption. For example, text block 201 comprises the caption to table 202. Other text blocks represent single paragraphs or partial paragraphs appearing in each column. A text block may also represent a title or header that appears before a text block or any other page element. A text block may also represent a page number or any other separately identifiable portion of text. In addition, within each table 202 or FIG. 203, each line of text could be considered a text block, depending on configuration of the page segmentation application 101.

In other embodiments, text blocks may be defined to include consecutive and/or related portions of text. For example, two or more consecutive paragraphs of text uninterrupted by any other type of page element, page break or column break may be considered as a single text block. As another example, a header and one or more paragraphs immediately following the header may be considered a single text block. One skilled in the art will appreciate that various page element types may be defined, including others in addition to or instead of the described text block, table, and figure types. Any suitable page element types may be defined and used by the page segmentation application 101 to identify and classification page elements.

Page Segmentation Pipeline

Figure 3:
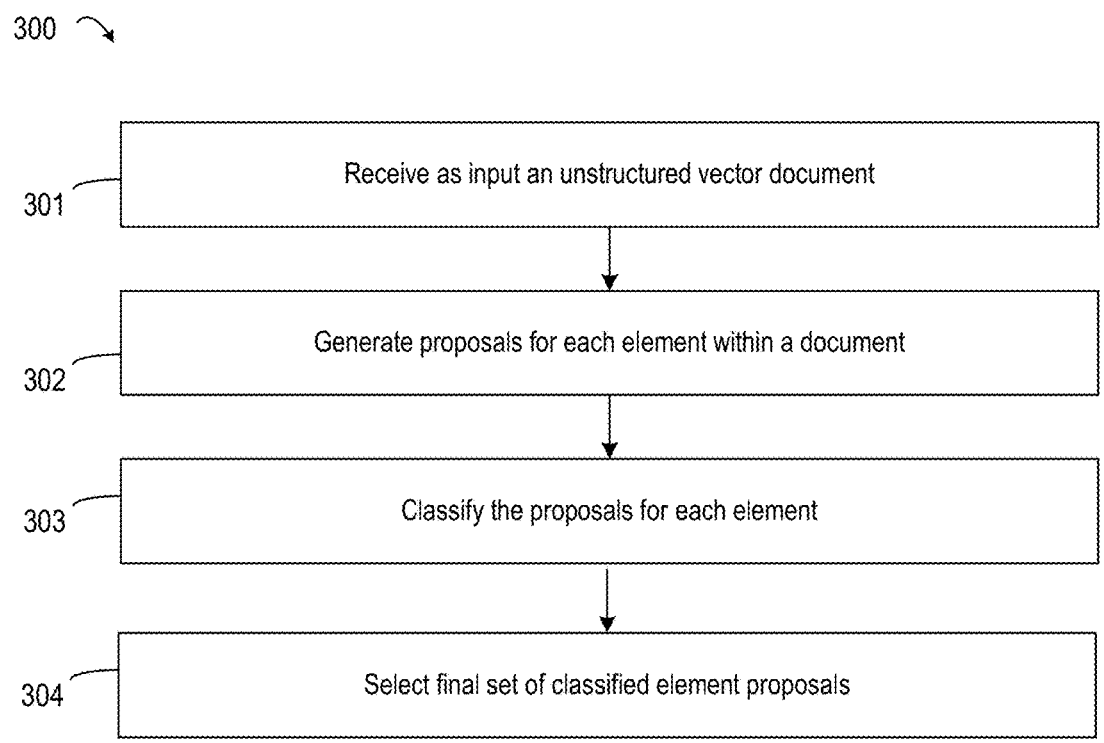
FIG. 3 is a diagram depicting an example pipeline of step for performing page segmentation, in accordance with certain embodiments.

FIG. 3 is a diagram depicting an example page segmentation "pipeline" 300 in accordance with certain embodiments. The pipeline represents the three major steps of a method to be performed by the page segmentation application 101 on an unstructured vector graphics document to produce a page segmented version thereof. As shown by way of example in FIG. 2, the output of the page segmentation pipeline 300 is document that includes an identification of, e.g., bounding box around each element instance on each page of the input document. The page segmentation pipeline 300 includes a first step 301 in which an input unstructured vector graphics document is received.

As will be explained, some embodiments disclosed herein do not require the use of any input beyond the unstructured vector graphics document itself. In such embodiments a page image is rendered from the input document and page segmentation is performed using only that page image. Preferably, the user also inputs at step 301 the page number of the input document for which page segmentation is desired. In other embodiments, each page of the document can be segmented either in serial or in parallel, depending on the capabilities of the computing system 100 and/or the configuration of page segmentation application(s) 101.

Other embodiments disclosed herein perform page segmentation using input including an unstructured vector graphics document and the drawing commands and/or other information about or derived from the input document. Drawing command and/or such additional information can help improve the accuracy of the page segmentation. For example, such additional information may include certain knowledge of the text contained within the document and/or the corresponding language of the text, e.g., English, which can improve the identification of text blocks. Other embodiments perform image processing techniques on the rendered page image of the input document to improve the accuracy of the page segmentation.

At step 302 of the page segmentation pipeline 300, element proposals are generated. Each element proposal represents an area of the page that is deemed likely to contain a page element, such as a text block, table, or figure. The proposals may be identified by a bounding box. Some element proposals will be more correct than others, but one skilled in the art will appreciate that more accurate proposals may result in better page segmentation results.

At step 303 of the exemplary page segmentation pipeline 300, each identified page element proposal is classified by type. Types of page elements may include, for example, text box, table, or figure. Additional and/or alternative element types may be defined. In some embodiments, step 303 is optional and may not be implemented.

Next, at step 304 of the exemplary page segmentation pipeline 300, the set of classified element proposals is down-selected to produce a file set of final classified element proposals. For example, each tightly spaced or overlapping group of classified element proposals may be deemed to represent the same page element and one such element proposal may be selected as best representing that page element. In this example, the final page element proposal may be the one having the smallest bounding box that appears to fully encompass the page element. Other methods for selecting a final set of element proposals will occur to those skilled in the art. Depending on the accuracy of results achieved at each step of the page segmentation pipeline 300, the final set of element proposals will represent an instance level page segmentation of the input document.

As discussed in more detail herein, a variety of techniques, such as neural networks, other machine learning algorithms, or non-machine learning algorithms may be used to perform each step of the exemplary page segmentation pipeline 300. Some embodiments use two or more of these techniques in conjunction with each other.

Figure 4A:
FIG. 4A, FIG. 4B, and FIG. 4C, shows diagrams depicting an input vector graphics document file, corresponding element proposals, and classified and selected element proposals, in accordance with certain embodiments.
Figure 4B:
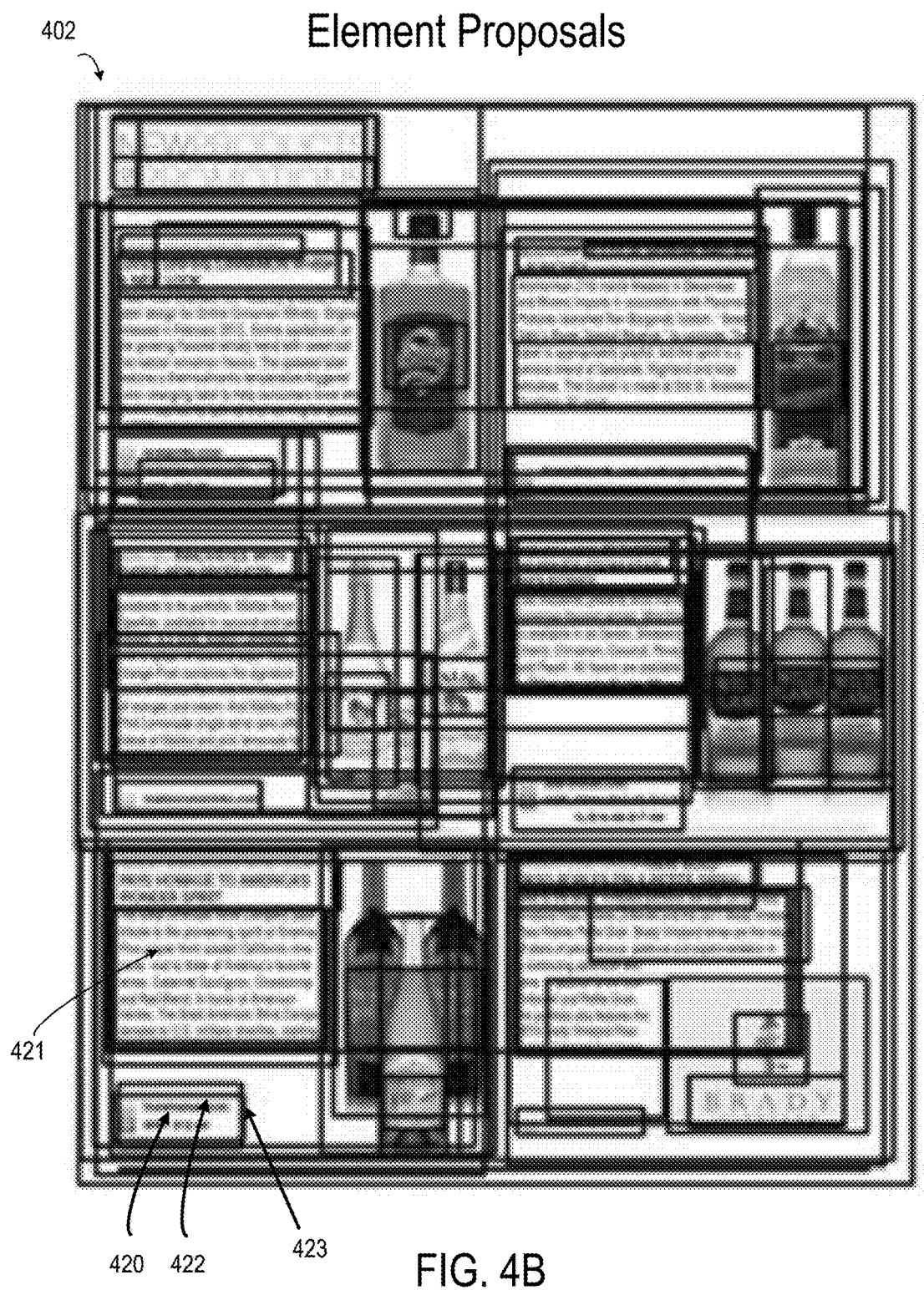
Figure 4C:

FIG. 4 comprises FIGS. 4A, 4B, and 4C. FIG. 4 comprises diagrams depicting rendered page images 401, 402, and 403 of an input unstructured vector graphics document at various stages of page segmentation pipeline 300, in accordance with certain embodiments. It should be appreciated that these exemplary rendered page images 401, 402, 403 may or may not be displayed to a user during processing. FIG. 4A depicts the rendered page image 401, which corresponds to an exemplary input unstructured vector graphics document and contains multiple page elements such as text box 410, and FIG. 411. These page elements are readily identifiable to a human observer, but are not, prior to page segmentation, identifiable by computer software processes given the lack of structural information in the input vector graphics document.

FIG. 4B is a diagram depicting the rendered page image 402 of an input unstructured vector graphics document, in accordance with certain embodiments. Rendered page image 402 corresponds to the input document after completion of the element proposal generation step 302 of the page segmentation pipeline 300. As shown the element proposal generation step 302 may not be accurate or precise and may be over inclusive. For example, what appears as a single text box element 420 to a human observer may be proposed by the page segmentation application as being multiple different page elements 422 and 423. Bounding boxes may also be too large or too small as compared to the page elements 420 and 421 they are intended to identify. As a result, many of the page element proposals may be incorrect in some way.

FIG. 4C is a diagram depicting the rendered page image 403 of an input unstructured vector graphics document, in accordance with certain embodiments. Rendered page image 403 corresponds to the input vector graphics document after completion of the classification step 303 and the selection step 304 of the page segmentation pipeline 300. Each classified proposed page element is examined and a final set of page element proposals is selected. As shown, this further processing has more accurately and precisely identified the bounds of each page element, each page element corresponding to an instance of one of the defined element types (e.g., text, table, or figure). As an example, the multiple page elements 422 and 423 from page image 402, which actually correspond to the same page element, are down-selected to page element 430 in page image 403.

Figure 5:
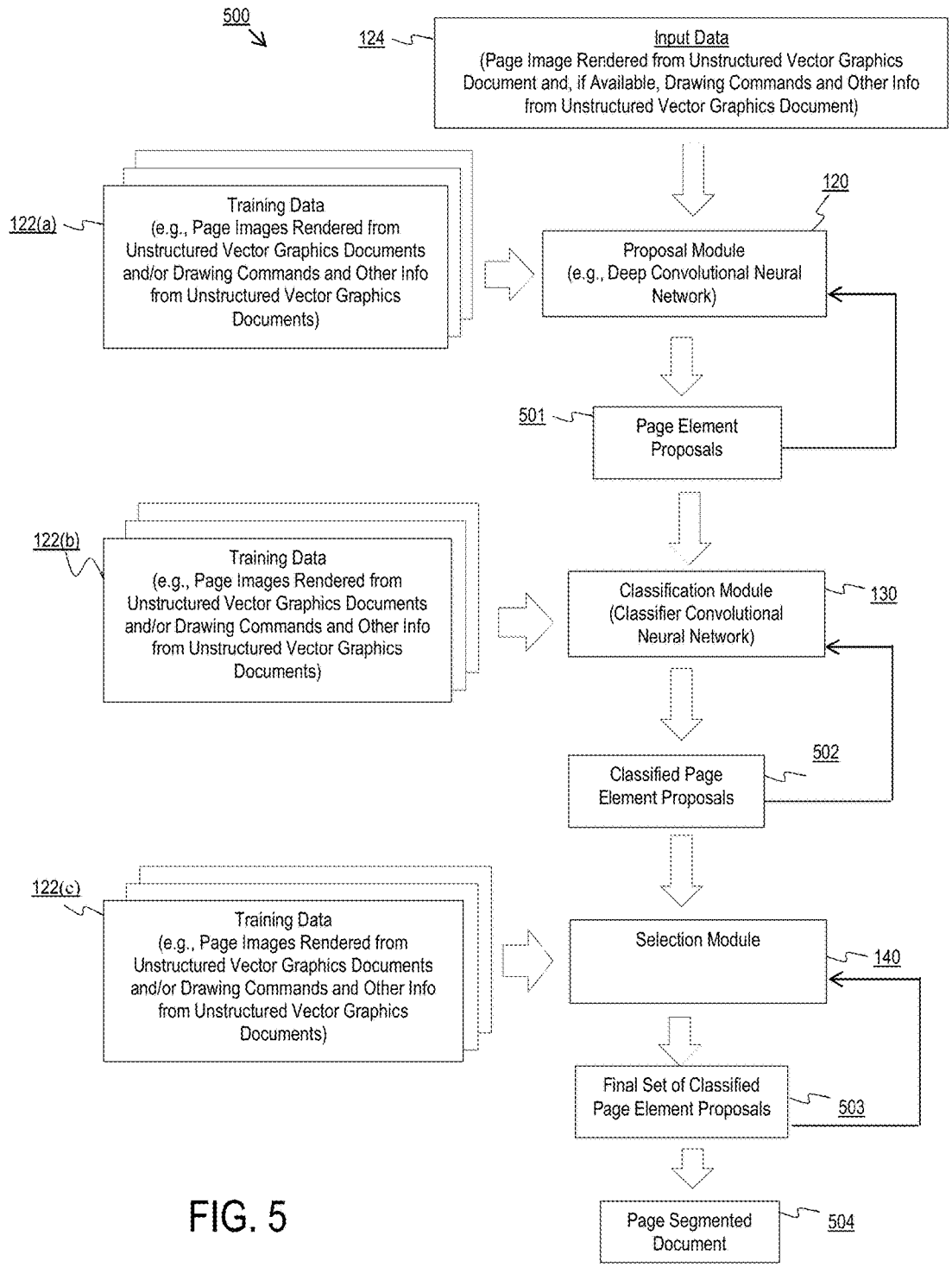
FIG. 5 is a diagram depicting the functional components and process flow of an example page segmentation application

FIG. 5 is a diagram depicting the functional components and process flow of an example page segmentation application 101. As discussed, the three main components of the page segmentation application 101 are the proposal module 120, the classification module 130, and the selection module 140. Each such module performs one step in the page segmentation pipeline 300: generating element proposals, classifying the element proposals, and selecting a final set of page element proposals. In the illustrated embodiment, each of the various modules are implemented by a particular type of trained neural network.

Element Proposals

The proposal module 120 illustrated in FIG. 5 performs the element proposal generation step 302 of the page segmentation pipeline 300. In one embodiment, that proposal module 120 comprises a deep convolution neural network, such as a reconfigured version of the so-called Faster R-CNN, which had originally been designed for object identification in images of natural objects. For example, the traditional Faster R-CNN architecture may be redesigned so that the receptive field for a possible page element is larger than the bounding box to be predicted. Such a reconfiguration of Faster R-CNN is performed to accommodate the fact that elements of a document, such as a table, might occupy the entire page, among other reasons. Additionally, the traditional Faster R-CNN architecture may be redesigned to handle different aspect ratios of elements in an unstructured vector document, e.g., a 20:1 ratio.

Further, given the limited size of the receptive field, the Faster R-CNN used in this embodiment may be trained and tested over multiple image resolutions in order to cover page elements that are large, e.g., a table that covers nearly an entire document page. During a training phase, training data 122(a) is input to the deep convolutional neural network of the proposal module 120. The network processes the training data 122(a) and outputs a set of element proposals for each input document page represented by the input data. The output may be fed back into the Faster R-CNN as additional training data 122(a).

The training data 122(a) for training the neural network of the proposal module 120 can include not only rendered page images, but also, if available, drawing commands and other information from vector graphics documents. The training data should include the correct page segmentation result, i.e., bounding boxes identifying individual elements appearing on pages of input documents, so that the algorithm can learn for such examples.

In one embodiment, the training data 122(a) may additionally include image channels that are derivable from an input vector graphics document. For example, an image including only text can be rendered from a vector graphics document, e.g., an image of black text on a pure white background, and used as additional training data 122(a). Including this additional image channel may improve the network's ability to generate text block proposals because the network is given an input channel that does not contain any other types of elements.

Some embodiments contemplate the use of still other input channels for training the neural network. For example, a rendering of only the text elements in the document can be generated and used as an additional training input into the proposal module 120. This relieves the proposal network of identifying the actual characters of the text runs and assists the proposal network in identifying text on a colored background, for example.

In another example, in certain embodiments, an input channel for training the neural network of the proposal module 120 may include only renderings of the images included in a vector graphics document. This type of input channel may help the network more robustly generate figure element proposals because the bounds of each rendered image often correspond to the bounds of the visual element to be identified by the network. Plots and graphs may not be included in this type of input channel because there can be white space around a plot or graph, which may not be desirable to include in the output element bounds.

As another option, an input channel can be created by rendering only the horizontal and vertical paths specified in vector graphics documents. This type of training data 122(a) can help generate table proposals for tables that are outlined. As another option, all paths for each vector graphics document can also be rendered and used as an additional input channel. This input channel may help the network to generate figure proposals for vector artwork included in a page of a vector graphics document.

Other additional features that can also be rendered from vector graphics document files and used as input channels for training the neural network of the proposal module 120, which may be useful for generating element proposals. As an example, font size, font ID, or font characteristics (e.g., bold or not, italics or not) for text locations could be used. The change in font size or the font itself of the font characteristics may be useful to distinguish between a header text block and a paragraph text block. While there will be visual differences in the page image between two such text blocks that the proposal module 120 should handle, additional hints about fonts used in the document may make the method more robust.

As can be appreciated from the above examples, these and other additional input channels can allow the proposal module 120 to isolate parts of some page element types and can reduce network "confusion." For example, it may be difficult to generate text block proposals if an input page has a faint image background under the text. But an input channel for the input page with only text rendered on a pure white background should make it less confusing to the network as to where the text block occurs. The concept of using additional feature images is not limited to embodiments where the proposal module 120 is implemented using a neural network or other machine learning algorithms and can be applied to non-machine learning based element proposal methods as well, which may be used in some embodiments.

Some embodiments may use synthetic or half-synthetic training data to train the neural network of the proposal module 120. Synthetic data is data which is automatically-generated without any human interaction. On the other hand, half-synthetic data is a mix of manually created data and synthetic data generated, for example, by removing from an unstructured vector document some of the usual document element types such as text boxes, figures, and/or tables and replacing them with different element types in a copy of that vector document to thereby create an additional vector document. For example, a text box may be replaced with a figure in a particular document to create a new training document. Additionally, training data 122(a) may include positive or negative truth data for the elements within a data set. The proposal module 120 may compare the generated element proposals with the positive or negative truth data and use this feedback to improve results.

Figure 6:
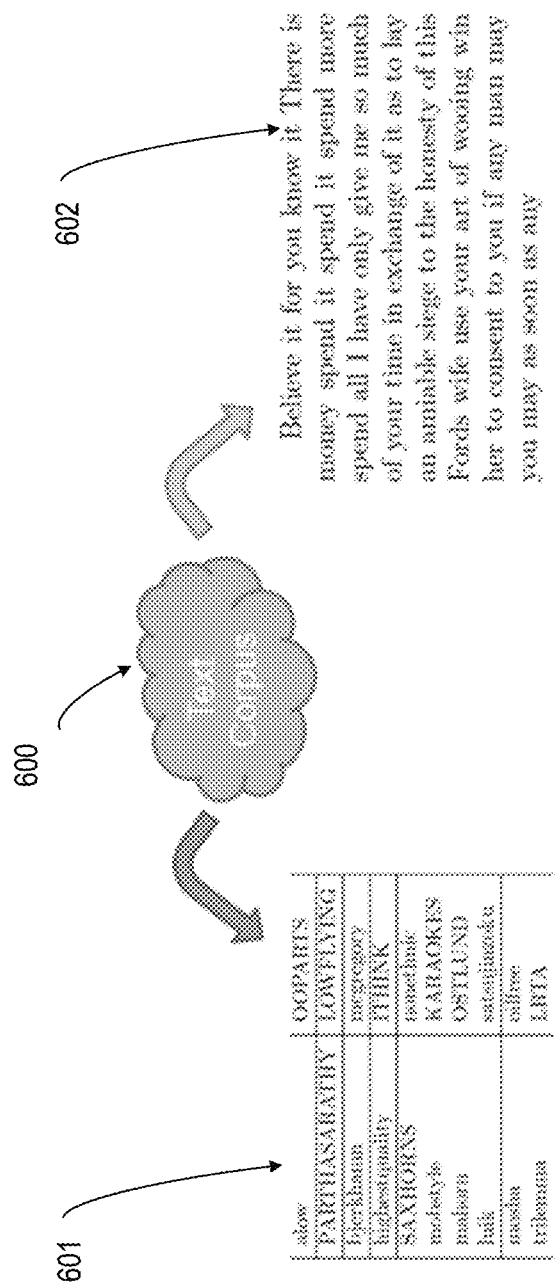
FIG. 6 is a diagram showing an example of synthetic training data generated from the text corpus of a document page, in accordance with certain embodiments.

FIG. 6 shows an example of synthetic training data generated from the text corpus 600 of a document page, in accordance with certain embodiments. The synthetic training data includes synthetic table 601 and synthetic text block 602 used to train the proposal module 120. The synthetic text table 601 has pre-determined dimensions and is populated with words which are automatically selected from the text corpus 600. Similarly, the synthetic text block 602 is of a predetermined length and is generated with random words or phrases selected from the text corpus.

After the neural network of the proposal module 120 is trained as describe above, input data 124 comprising an unstructured vector graphics document is provided as input. Any other types of input data 124 from or derived from the input documents may also be provided to the proposal module 120 as additional input channels, if desired and to the extent available. Such additional input data 124 may include any type of data that was also used as training data 122(a), as discussed above. The proposal module 120 processes the input data 124 and generates a set of page element proposals 501 for a page of the input vector graphics document.

Figure 7A:
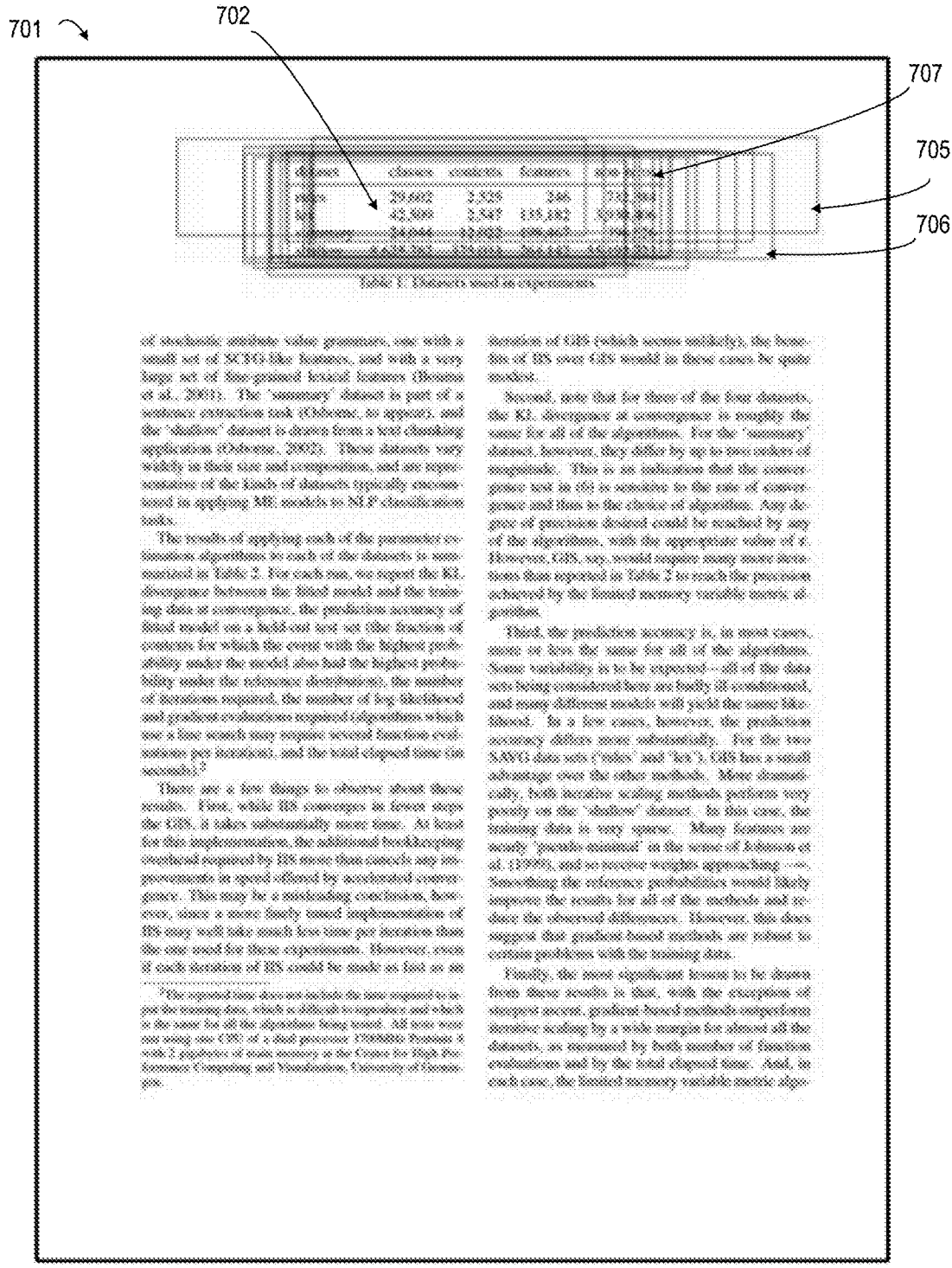
FIG. 7A and FIG. 7B, shows diagrams depicting outputs of a neural network trained to generate element proposals comprising only table and figure proposals, in accordance with certain embodiments.
Figure 7B:
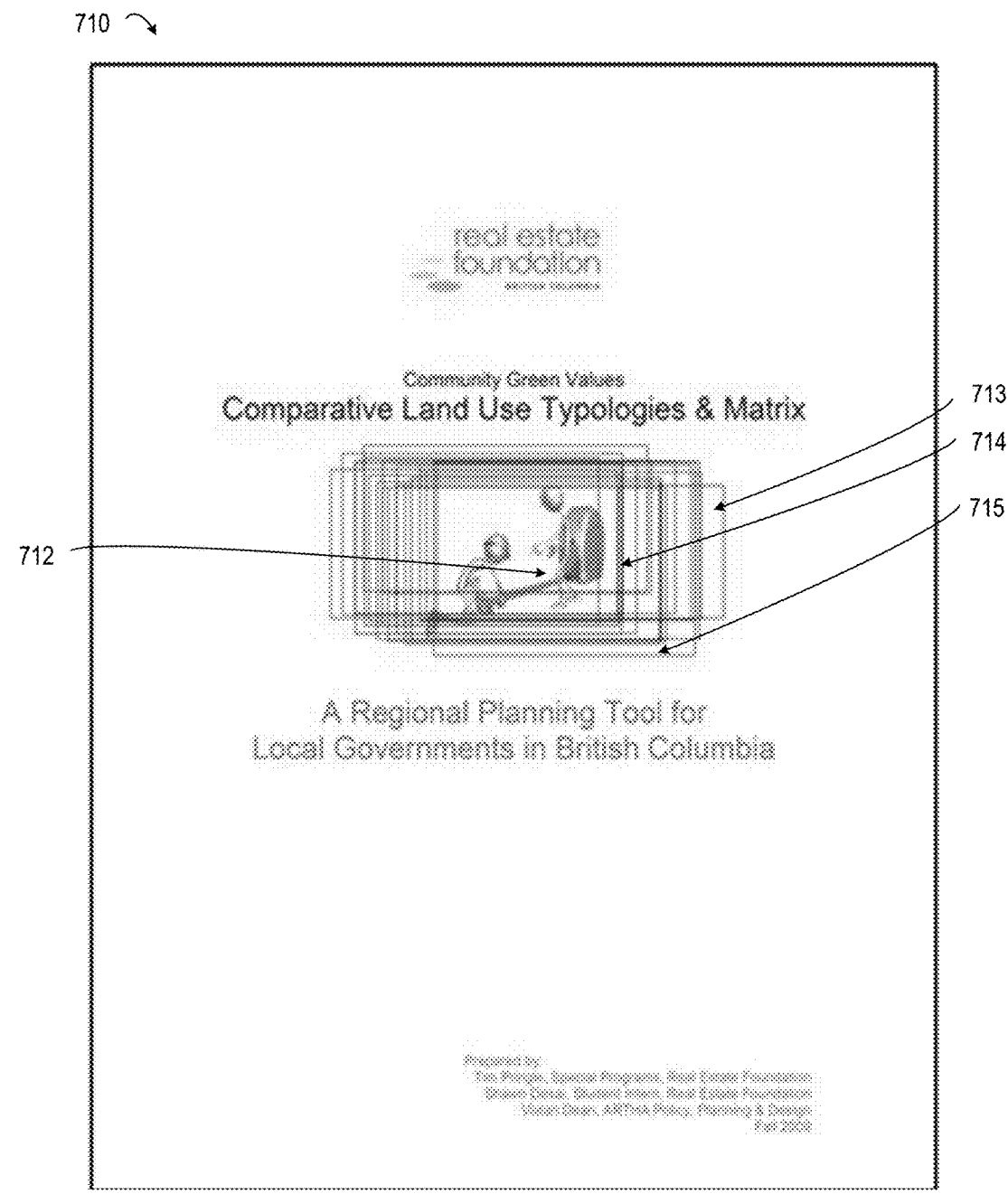

Additional examples of output generated by a trained proposal module 120 are shown in FIG. 7, which comprises FIGS. 7A and 7B. FIG. 7A shows the document page 701, which includes a table element 702. FIG. 7B shows a document page 710, which includes a FIG. 712. For document page 701, it can be seen that the proposal module 120 generates numerous element proposals such as indicated by bounding boxes 705, 706, and 707, each corresponding to an area on the document page 701 that might comprise the table element 702. As discussed, many of these element proposals and their corresponding bounding boxes 705, 706, and 707 are not accurate or precise. Therefore, one of the element proposals will need to be selected as the final page element proposal, as explained elsewhere herein. For the document page 710 in FIG. 7B, it can be seen that the proposal module 120 generates numerous element proposals, such as indicated by bounding boxes 713, 714, and 715, each corresponding to an area on the document page 710 that might comprise the figure element 712. Many of these element proposals and their corresponding bounding boxes 713, 714, and 715 are clearly not accurate or precise. Therefore, one of the element proposals will need to be selected as the final page element proposal, as explained herein. For the sake of clarity, FIG. 7A and FIG. 7B do not show reference numbers for all of the illustrated element proposals and do not show element proposals for text block elements included in document pages 701 and 710.

If the results generated by the deep convolutional neural network of the proposal module 120 are not acceptable to either a human observer or the page segmentation application 101, the results can be fed back into the network for the purpose of adjusting network parameters and this process of executing the neural network can be repeated until the results generated by the network are satisfactory. In some embodiments a human observer identifies unacceptable or unsatisfactory results produced by the neural network and may correct and use the corrected results to create additional training data for future training. In still other embodiments an automated determination, for example, using heuristics, may be made as to whether or not the element proposal results are acceptable or otherwise meet a certain quality threshold, as will be appreciated by those skilled in the art. For example, a heuristic may be designed to determine whether the edge of a bounding box around a text block cuts through any text, because presumably it should go around the text and not through it.

In other embodiments, the proposal module 120 may focus just on one element type, e.g., text or figures, contained within the unstructured vector graphics document or training data, and then provide additional information into the network. In one example, the black bounding boxes for text on the page are rendered, instead of the actual characters of the text. The resulting geometry of the text block is then used as an additional input to the network. This method reduces the computational complexity involved because resources are not needed to learn to ignore the detailed contours of the letters. This method helps the proposal module identify text on a colored background.

In another example, the rendered images in the unstructured vector graphics document or training data may be provided to the proposal module 120 as another input channel and/or refine the parameters of the neural network. This method helps the proposal module 120 more robustly generate figure element proposals, because the bounds of the image are often the bounds of the visual element within the unstructured vector graphics document.

In another example, the rendered horizontal and vertical paths on a page within an unstructured vector graphics document or training data may be provided to the proposal module 120 and added to the network as further input. This can help generate table proposals for tables that are outlined. Similarly, the neural network may render all the paths on a page, which may be fed those back into the network as an additional input channel and/or refine the parameters of the neural network. This input may help the proposal module in generating figure proposals for vector artwork on the page. Additional inputs isolate parts of some element types and can reduce network confusion. For example, it may be difficult to generate some text block proposals if an input page has a faint image background under the text. But an additional input for the page with only text rendered on a pure white background should make identification of where the text blocks occur a lot less confusing to the proposal module.

Other additional features that can be rendered from the unstructured vector graphics document or training data may be useful for generating element proposals or instance level classification. For example, such additional features may include font size, font identification, or font characteristics (e.g., bold or not, italics or not) for text locations. For example, the change in font size or the font itself of the font characteristics may be useful to distinguish between a header text block and a paragraph text block. Of course, there will be visual differences in the page image between two such text blocks that the proposal module image-based analysis should handle, but such additional hints may make the method more robust. The same concept of using additional feature images applies to non-machine learning based element proposal methods.

The proposal module 120 may consist of a trained fully convolutional neural network (FCN) to perform an additional semantic page segmentation task. Semantic segmentation is a process that attempts to only label each pixel with its type, e.g., text, figure, or table. With semantic segmentation, there is no instance information determined, i.e. different elements of the same type are not distinguished between each other. FCN is state-of-the-art for semantic segmentation of images of natural objects into semantic classes. FCN may be adapted for the proposal generation module. Dilated convolution and multi-scale fusion may be used to obtain larger contexts for correctly labeling pixels (e.g., for a large table that covers nearly the entire page). The output of the semantic segmentation output can be incorporated by the proposal module 120 in order to build proposals for a better instance-level page segmentation.

In other examples, XY-cut methods may be performed on the semantic segmentation output to generate element proposals. As discussed further herein, XY-cut page segmentation analyzes a hypothetical projection of ink onto the horizontal (X) and vertical (Y) axes of a document by creating ink profiles, or histograms, and computes elements based on those histograms. Additionally, in some examples, Selective Search, from the computer vision literature can be run on the semantic segmentation output. In another example, the semantic segmentation output could also be used as an additional channel of input to the proposal module 120.

Figure 8A:
FIG. 8A and FIG. 8B, shows diagrams depicting the input to and the output of a neural network used to perform semantic segmentation for generating element proposals, in accordance with certain embodiments.
Figure 8A:
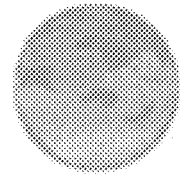
Figure 8A:
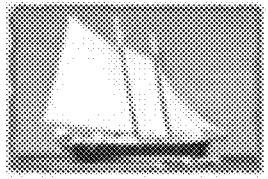
Figure 8B:
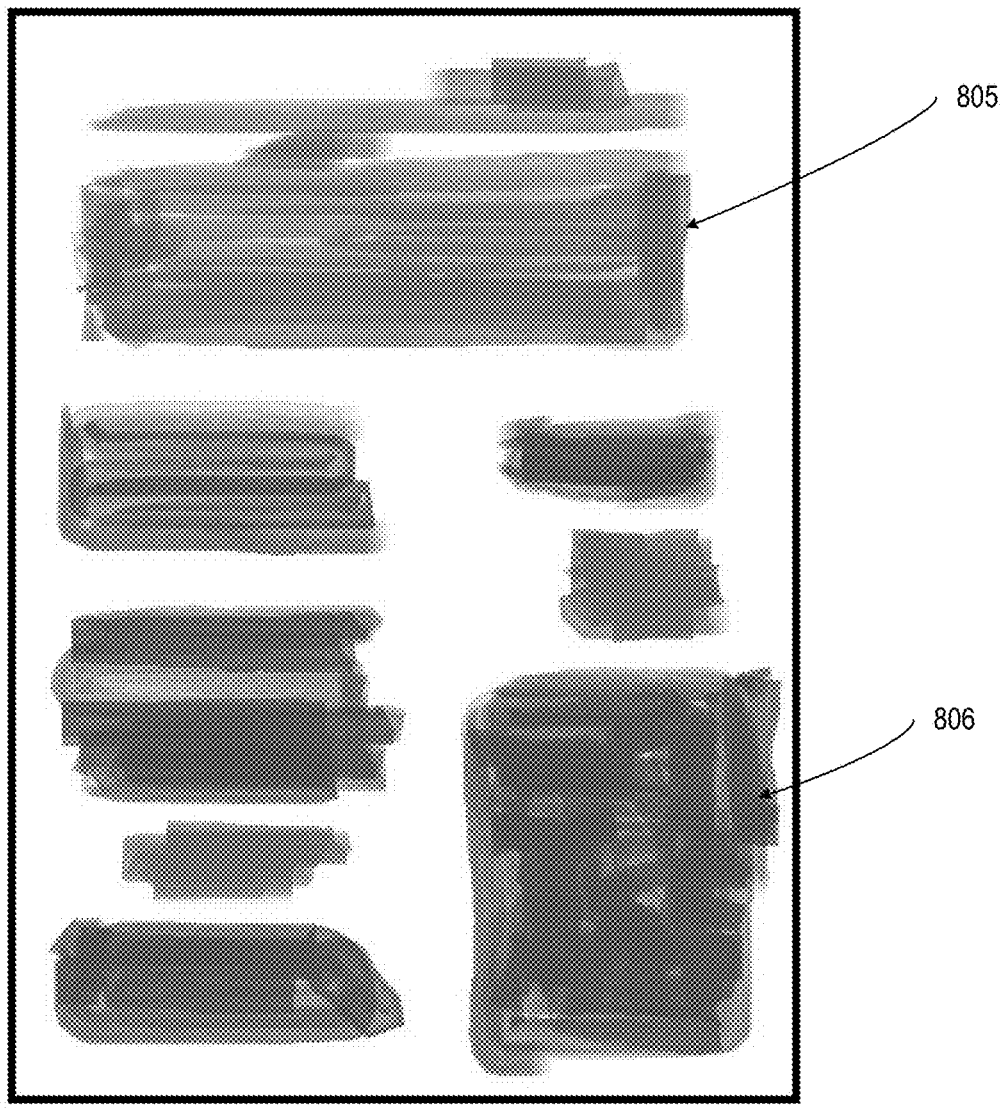

FIG. 8, comprises FIG. 8A and FIG. 8B. FIG. 8 shows diagrams depicting the input and the output of a neural network used to perform semantic segmentation for generating element proposals, in accordance with certain embodiments. FIG. 8A is a diagram depicting the input to a neural network used to perform semantic segmentation for generating element proposals, in accordance with certain embodiments. Referring to FIG. 8A, the document 801 shows the rendered image input to the network. The document includes a figure element 803 and a text block element 804, among other elements. Referring to FIG. 8B, the document 802 shows the highlighted areas resulting from semantic segmentation. For example, highlighted area 805 identifies the figure element 803 from document 801 and highlighted area 806 identifies the text block element 804 from document 801. As illustrated, highlighted areas 805 and 806, which clearly correspond to different types of elements in document 801, are not distinguishable by type in document 802.

In yet other embodiments, the XY-cut page segmentation method may be used to generate element proposals. XY-cut page segmentation analyzes a hypothetical projection of ink onto the horizontal (X) and vertical (Y) axes of a document by creating ink profiles, or histograms, and computes elements based on those histograms. If whitespace exists between two page elements positioned above each other on the page, then the vertical profile of total ink will transition from high, representing the point before the white space, to low during the whitespace, and back to high when the text continues. Similarly, the XY-cut method will show a dip in the horizontal whitespace between two horizontal page elements.

Additionally, XY-cut may be used on an input image rendered from a vector graphics document that indicates clusters of text runs (e.g., a continuous block of text). The text runs may be identified using the information contained in the input vector document. The input image may be formatted in such a way to discourage the algorithm making a cut between text runs, and thus potentially separating a block of text that should not be separated. In this configuration, XY-cut is discouraged from making a cut between clusters of text runs, thus improving the performance of the proposal module.

In yet another example, the parameters of the XY-cut algorithm may be varied in order to accomplish different page segmentations. XY-cut has various parameters that indicate the point at which the gap in the white space becomes significant. More specifically, the XY-cut algorithm's parameters control determination of which peaks and troughs (maxima and minima respectively) may be used to generate the output elements. For example, small white space between paragraphs would be ignored as to not split two paragraphs. In some embodiments, the input vector file may be used to set these parameters.

In yet another example, the XY-cut method may be applied to a page image by disallowing output bounding boxes that are adjacent to a text run. Because a text run will be either entirely within a text block, or entirely outside of a text block, the XY-cut method may be further limited to improve results.

In yet another example, the XY-cut method may be used to increase the robustness of text generation by operating on a rendering of a vector graphics document that only includes text. This method increases the robustness of the page segmentation when text is displayed above a background image, because the ink from the image will not confuse the proposal module 120. In another further example, the XY-cut method may be used to generate proposals by varying the parameters of the method to give multiple page segmentations. The XY-cut method has as input parameters which allow configuration of the maxima and minima thresholds of the ink profiles which trigger the analysis. Accordingly, these parameters are varied to achieve different results.

In some embodiments, XY-cut segmentation may be employed as an additional proposal generating step used along with other methods described herein, and the additional proposals added to the set of element proposals. For example, XY-cut segmentation may be applied in conjunction with semantic segmentation, for example as an input channel to the proposal module. The XY-cut method may receive the output from a semantic segmentation performed on the image of a page.

Proposal Classification

The classification module 130 in the embodiment of FIG. 5 performs the classification step 303 of the page segmentation pipeline 300. The classification module 130 receives the generated page element proposals 501 from the proposal module 120 and generates a set of classified page element proposals 502. For page segmentation to be accomplished, i.e., every individual element on the page be identified and properly classified, the generated page element proposals 501 must be correct at the instance level. Instance-level correctness means that the proposals for an element must include at least one proposal that encompasses all of the instance of that element, and does not include any other instances of any other element(s). For example, for a particular text box, there must exist at least one element proposal that identifies the text box and does not encompass any other text boxes. The classification module 130 classifies each proposed element by type, e.g., figure, text box, or table.

In some embodiments the classification module 130 comprises a standard Convolutional Neural Network (CNN) trained to classify page element proposals into defined classes. For example, the CNN may be configured as a 3-class classifier trained to classify each page element as a text block, a table, or a figure. The network receives a set of page element proposals 501 from the proposal module 120 and generates classified page element proposals 502. In this way, the classification module 130 performs the classification step of the page segmentation pipeline 300. The classification module 130 is initially trained and its output, if unsatisfactory, may be fed back into the classifier neural network for adjustment of network parameters. In some embodiments, unsatisfactory results may be corrected and used to create additional training data 122(b) for future training.

A 3-class CNN according to certain embodiments may be configured to classify elements into the three classes of text block, table, and figure. Even though these classes have significant visual differences, there are still visual overlaps among the classes that make the task of classification non-trivial. For example, both text blocks and tables contain mostly text. Figures may also contain text, e.g., advertisements with graphics and text. Sometimes, a figure may contain an equal amount of graphic and text, e.g., for a logo. Therefore, careful training and refinement of the CNN based on training results is needed.

The convolutional neural network of the classification module 130 may be trained using any of the types of training data 122(b) used to train the proposal module 120, as applicable. The training data 122(b) for training the neural network of the classification module 130 can include not only rendered page images, but also, if available, drawing commands and other information from vector graphics documents. Training data 122(b) for the classifier neural network should be designed so that it reflects the type of element proposals that could be generated in the proposal step 302 of the pipeline.

To improve the performance of the classifier neural network, it may be trained to recognize additional output classes, rather than only the classes of text, figure, or table. The proposal module 120 only seeks to output bounding boxes that may contain exactly one document element, but it may be conservative in judgment so that no true document elements are missed. The ultimate goal of the page segmentation system is to classify elements at the instance-level, e.g., identify all different instances of one element type. Accordingly, the classifier module may have to accommodate more than three classes in order to ensure that different instances, e.g., two text blocks, can be separated from each other. For example, a classifier may be trained to recognize part of a text block (e.g., half of a paragraph), exactly one text block, or more than one text block (e.g., two paragraphs). Similarly, a classifier network may be trained to recognize part of a table, exactly one table, or more than one table. A classifier network may also be trained to recognize part of a figure, exactly one figure, or more than one figure. Finally, a classifier may be configured to recognize an additional category of "other," if it contains of any two different document elements such as a text block and a figure. This functionality improves results because the classifier must be able to identify and distinguish between proposals that contain multiple elements and proposals that contain single elements.

Further, some embodiments could be configured to use a classifier that can recognize over ten different classes or any other number of different classes. For example, a classifier can be trained to recognize: part of a text block (e.g., half of a paragraph); exactly one text block; more than one text block (e.g., two paragraphs); part of a table (e.g., some table data rows are missing or the table header row is missing); exactly one table; more than one table (e.g., two side-by-side tables); part of a figure (e.g., a whole plot except the x-axis label is missing); exactly one figure; more than one figure (e.g., two side-by-side images that are mistaken as one image); or other (e.g., bounding boxes that contain two different elements such as a table and a text block). In another example, a network could be trained to predict how many elements of each type of text box, table, and figure, are present within a given bounding box.

Training data 122(b) for the classifier neural network may be generated, for example, by dividing a bounding box that contains a single paragraph so that it is missing some lines or part of the paragraph. Training data 122(b) is also generated by combining two paragraphs into one bounding box. The CNN may use training data 122(b) that contains an accurate proposal that contains a single document element. Additionally, training data 122(b) may include positive or negative truth data for the elements within a data set. The proposal module 120 may compare the generated element proposals with the positive or negative truth data and use this feedback to improve results.

Training data 122(b) may be generated by vertically shrinking a bounding box that contains a single paragraph so that it is missing some lines. Training data 122(b) may also be generated by shrinking the bounding box horizontally so that parts of the paragraph fall out of the bounding box. Additionally, two nearby paragraphs may be combined into a single bounding box covering both paragraphs. The training data 122(b) should reflect the types of document proposals that could be generated by the proposal module.

In some embodiments, the set of classified page element proposals 502 output by the classification module 130, if deemed unsatisfactory, may be fed back into the neural network of the classification module 130 for adjustment of network parameters. In some embodiments, unsatisfactory results may be corrected and used to create additional training data 122(*c*) for future training of the proposal module 120, the classification module 130, and/or the selection module 140. Additionally, training data 122(*c*) may include positive or negative truth data for the elements within a data set. The classification module 130 may compare the generated element proposals with the positive or negative truth data and use this feedback to improve results.

Figure 9:
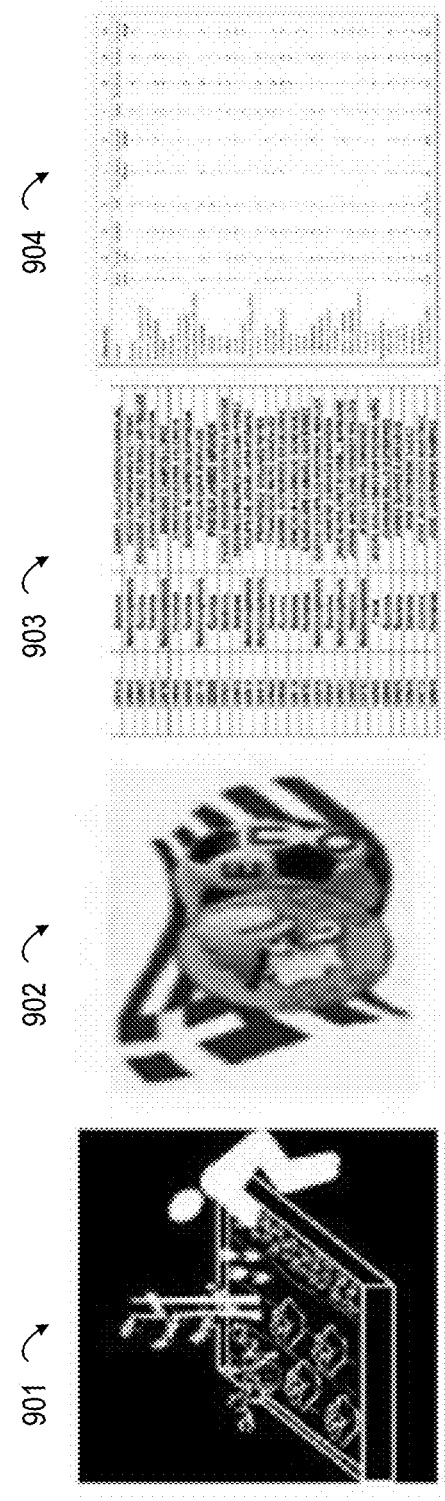
FIG. 9 is a diagram depicting the output of an exemplary method for classifying element proposals, in accordance with certain embodiments.

FIG. 9 is a diagram depicting the output of an exemplary method performed by the classification module 130 for classifying element proposals, in accordance with certain embodiments. Elements 901, 902, 903, and 904 are examples of page elements correctly classified using a classifier neural network, because in each case, the classification module 130 has isolated one instance of one type of element and correctly identified that element. For example, the classification module 130 has correctly classified elements 901 and 902 as figures, and 901 and 902 contain no other elements. Similarly, the classification module 130 has correctly classified elements 903 and element 904 as tables, and 903 and 904 contain no other elements.

Element Selection

The selection module 140 in the embodiment of FIG. 5 performs the final selection step 304 of the page segmentation pipeline 300. The selection module 140 receives the set of classified page element proposals 502 from the classification module 130 and processes them to select a final set of classified page element proposals 503. In doing so, the selection module 140 resolves overlapping text block element proposals, table element proposals, and figure element proposals to produce a final instance-level set of classified page element proposals. Additionally, in some embodiments, this step may include computing a pixel-level representation of document elements localized by proposal bounding boxes. The final set of classified page element proposals 503 are used to generate a page segmented document 504. In performing the final selection step 304 additional information from the unstructured vector document file may be used, such as the edges from text runs.

A trained neural network or other machine learning technique may be used to perform the selection step 304. The chosen algorithm may be trained using the types of data described with respect to the proposal generation and classification steps of the page segmentation pipeline 300. In some embodiments, a trained regression network, such as an R-CNN, may be used to adjust a given rectangular input to contain exactly one page element. Ideally, given a bounding box containing part of one paragraph, the regression network should output a tight bounding box around the paragraph to avoid missing elements if there is no proposal that exactly contains one of the document elements. In some embodiments, both a regression network and a classification network may be used together to perform the final selection step 304.

Accordingly, training data 122(*b*) may be generated by moving a tight element bounding box to generate a training pair of a jittered bounding box and a ground truth tight bounding box, which represents the entire desired element (e.g., an entire figure). Alternatively, a tight bounding box may be shrunk to generate a training pair of a shrunken bounding box and a ground truth tight bounding box, along with the page image. The network may also be trained with input bounding box that contain only a single page element but with a bounding box that is not a tight bounding box. With such training data 122(*b*), the regression network tightens correctly, but produces inexact element bounding boxes.

Regression networks have been applied successfully to adjust bounding boxes to better cover real world objects. In some embodiments, an R-CNN may be used to perform the final selection step 304. For example, one regression network that adjusts coarse object proposals exists within the faster R-CNN. Also, one regression network within the subsequent classification part of the faster R-CNN pipeline adjusts the classified object proposal. Such training techniques may be used for generation of artificial page elements. The availability of the unstructured vector document may provide the ability to restrict the possible output bounding box. Additionally, in some examples, the R-CNN pipeline may be an end-to-end pipeline which performs proposal generation 302, classification 303, and the final selection 304 in one network.

In yet another embodiment, the output of a regression network may be restricted or encouraged to key horizontal and vertical lines identified from the vector graphics document. For example, the boundaries of text runs, the boundaries of text lines, the bounding boxes of input graphics, or the horizontal and vertical paths bounding a table may be used as key horizontal or vertical lines. Thus, such information available from the unstructured vector document may guide the classification module.

In yet a further embodiment, the output of a page element regression proposal network, operating within the proposal module 120, may be similarly restricted or encouraged to key horizontal and vertical lines identified from the vector graphics document.

For a variety of reasons, restricting or encouraging the regression network is helpful in generating better results. For example, boundaries of a paragraph often fall on the boundaries of text runs. Typically, a paragraph would does not have a true bounding box cut through a text run. Additionally, for the case where two paragraphs of nonrectangular shape are located next to one another, a bounding polygon instead of bounding box would prevent the bounds from cutting through a text run. The bounding box of an input graphics is often exactly the bounds of a figure, for example if the graphic depicts a natural object. Finally, because some tables are surrounded by lines, identifying the horizontal and vertical paths as candidate snapping bounds may be beneficial.

In yet another embodiment, the entire page image or significant amount of the page image around the input area under evaluation and a mask indicating the area to classify or evaluate is provided as input to neural network. For page segmentation, more input to a network can improve results by providing context. Accordingly, inputting the whole image as well as the particular area to classify or adjust may be beneficial.

In some embodiments, the final set of classified page element proposals 503 output by selection module 140, if deemed unsatisfactory, may be fed back into the regression neural network for adjustment of network parameters. In some embodiments, unsatisfactory results may be corrected and used to create additional training data 122(*c*) for future training of the selection module 140, the classification module, and/or the proposal module 120. Additionally, training data 122(*c*) may include positive or negative truth data for the elements within a data set. The proposal module 120 may compare the generated element proposals with the positive or negative truth data and use this feedback to improve results.

Figure 10:
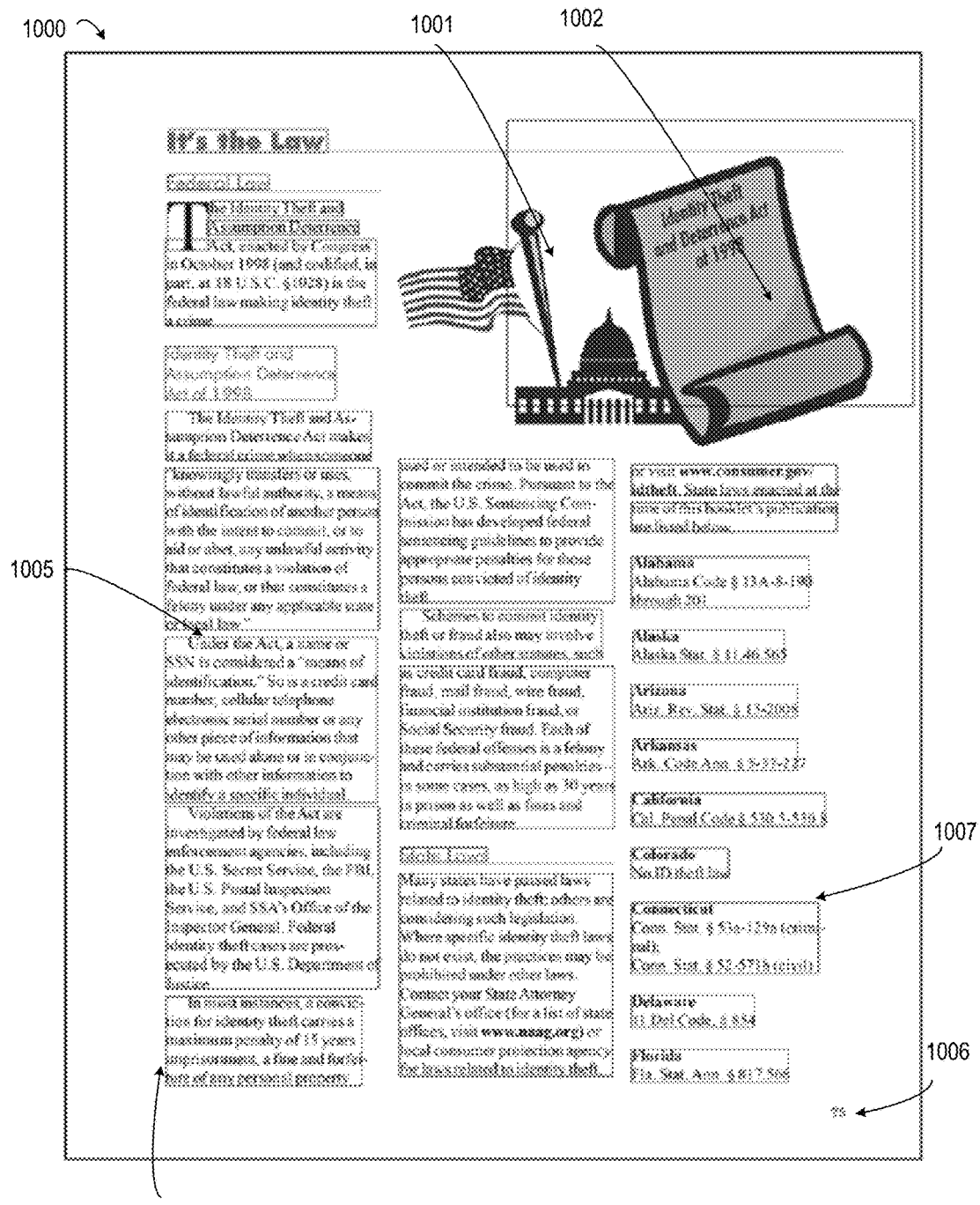
FIG. 10 is a diagram depicting an example page segmentation result from the page segmentation functions, in accordance with certain embodiments.

FIG. 10 is another example of a rendered page image 1000 showing the final results of the page segmentation process described herein, as output by the selection module 140. As shown, some of the final results in this example are not ideal. Although the page segmentation application 101 has correctly identified and classified most of the page elements, for example text block element 1005, many of the corresponding bounding boxes finally selected are not drawn to the proper size so as to fully encompass the corresponding elements, for example bounding boxes 1004 and 1001

In one example, the bounding box 1001 surrounding the figure element 1002 in the top right corner of the page 1000 is too narrow and not properly aligned in the vertical direction. As a result, bounding box 1001 does not encompass the entire figure element 1002. In this case, the proposal module 120 may have not generated a proper proposal for figure element 1002, and/or the selection module 140 may have not selected the best classified proposal corresponding to figure element 1002.

As another example, each of the bounding boxes along the right margin and a few, e.g., bounding box 1004, along the left margin are also too narrow and do not encompass the entirety of the corresponding text block elements. Similarly, the bounding box 1007 is too narrow and does not encompass the entirety of the corresponding text block elements. The page number element 1006 at the bottom right of the page 1000 is also not identified as being a text block element. In this case, the proposal module 120 may have completely missed the page number element 1006. In the case of a less than ideal result such as this, the segmented page could be incorporated back into one or more of the proposal module 120, the classification module 130, or the selection module 140 as training data so that the machine learning machine algorithms of the page segmentation application 101 learn and improve.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method for generating a page segmented document from an unstructured vector graphics document, the method comprising:
   receiving, by a processing device, input comprising an unstructured vector graphics document, the unstructured vector graphics document comprising a drawing command;
   generating, by the processing device, an element proposal for each of a plurality of areas on a page of the unstructured vector graphics document tentatively identified as being page elements, wherein each of the element proposals is generated at least in part based on analysis of the drawing commands; and
   classifying, by the processing device, each of the element proposals into one of a plurality of defined types of categories of page elements, the classification generated at least in part based on the drawing commands, wherein at least one of (i) generating the element proposal for each of the plurality of areas on the page and (ii) classifying each of the element proposals is performed at least in part using a trained neural network.

2. The method of claim 1, further comprising rendering, by the processing device, a page image from the unstructured vector graphics document and using the rendered page image as additional input for performing at least one of (i) generating the element proposal for each of the plurality of areas on the page and (ii) classifying each of the element proposals into one of the plurality of defined types of categories of page elements.

3. The method of claim 1, wherein generating the element proposal for each of the plurality of areas on the page comprises creating a bounding shape around each area.

4. The method of claim 1, further comprising selecting, by the processing device, a set of final classified element proposals within the page of the unstructured vector graphics document by resolving overlapping element proposals within the page.

5. The method of claim 4, further comprising refining a bounding shape for each final classified element proposal in the set of final classified element proposals.

6. The method of claim 4, further comprising rendering, by the processing device, a page image from the unstructured vector graphics document and using the rendered page image as additional input for performing the step of selecting the set of final classified element proposals within the unstructured vector graphics document.

7. The method of claim 1, wherein the trained neural network is trained using at least one of synthetic data and half-synthetic training data.

8. The method of claim 1, further comprising, providing, by the processing device, additional input channels to the trained neural network for use in performing the step of generating the element proposal for each of the plurality of areas on the page, wherein the additional input channels comprise at least one of black text rendered on a white background, rendered bounding shapes, horizontal and vertical paths of a document, or font characteristics.

9. The method of claim 1, wherein the step of generating the element proposal for each of the plurality of areas on the page is performed at least in part using a trained deep convolutional proposal network.

10. The method of claim 1, wherein the step of generating the element proposal for each of the plurality of areas on the page comprises performing semantic page segmentation using a trained fully convolutional neural network (FCN), and wherein the step of generating the element proposal for each of the plurality of areas on the page further comprises separating the element proposals into individual instances.

11. The method of claim 1, wherein the step of generating the element proposal for each of the plurality of areas on the page is performed at least in part using an XY-cut page segmentation method.

12. The method of claim 1, wherein classifying each of the element proposals is performed at least in part using a trained convolutional neural network (CNN).

13. The method of claim 5, wherein at least one of (i) generating the element proposals is performed at least in part using horizontal and vertical lines identified from the unstructured vector graphics document and (ii) selecting the set of final classified element proposals is performed at least in part using horizontal and vertical lines identified from the unstructured vector graphics document.

14. A system comprising:
at least one non-transitory computer-readable medium storing an unstructured vector graphics document and computer-executable instructions for performing a page segmentation process on the unstructured vector graphics document; and
a processing device communicatively coupled to the at least one non-transitory computer-readable medium for executing the computer-executable instructions, wherein executing the computer-executable instructions configures the processing device to perform operations comprising:
receiving as input from the at least one non-transitory computer-readable medium the unstructured vector graphics document, the unstructured vector graphics document comprising a drawing command;
generating an element proposal for each of a plurality of areas on a page of the unstructured vector graphics document tentatively identified as being page elements, wherein each of the element proposals generated at least in part based on an analysis of the drawing command;
classifying each of the element proposals into one of a plurality of defined types of categories of page elements, the classification generated at least in part based on the drawing command; and
selecting a set of final classified element proposals within the page of the unstructured vector graphics document by resolving overlapping element proposals within the page, wherein at least one of (i) generating the element proposal for each of the plurality of areas on the page and (ii) classifying each of the element proposals is performed at least in part using a trained neural network.

15. The system of claim 14, further comprising refining a bounding shape for each final classified element proposal in the set of final classified element proposals.

16. A non-transitory computer-readable storage medium storing computer-executable program instructions, wherein when executed by a processing device the computer-executable program instructions cause the processing device to perform a method comprising:
a step for receiving input comprising an unstructured vector graphics document, the unstructured vector graphics document comprising a drawing command;
a step for executing a first machine learning algorithm trained to generate an element proposal for each of a plurality of areas on a page of the unstructured vector graphics document tentatively identified as being page elements, wherein each of the element proposals generated at least in part based on an analysis of the drawing command; and
a step for executing a second machine learning algorithm trained to classify each of the element proposals into one of a plurality of defined types of categories of page elements, the classification generated at least in part based on the drawing command, wherein at least one of (i) generating the element proposal for each of the plurality of areas on the page and (ii) classifying each of the element proposals is performed at least in part using a trained neural network.

17. The non-transitory computer-readable storage medium of claim 16, wherein the method further comprises a step for selecting a set of final classified element proposals within the page of the unstructured vector graphics document by resolving overlapping element proposals within the page.

18. The non-transitory computer-readable storage medium of claim 17, wherein the method further comprises a step for refining a boundary shape for each final classified element proposal in the set of final classified element proposals.

* * * * *